(12) United States Patent  (10) Patent No.: US 7,487,892 B1
Hirsch                      (45) Date of Patent:    Feb. 10, 2009

(54) POWDERED SEED TREATMENT APPLICATOR

(76) Inventor: Gary Wayne Hirsch, R.R.1 Box 41, Cynthiana, IN (US) 47612

( * ) Notice: Subject to any disclaimer, the term of this patent is extended or adjusted under 35 U.S.C. 154(b) by 399 days.

(21) Appl. No.: 11/242,350

(22) Filed: Oct. 3, 2005

(51) Int. Cl.
B65D 88/54 (2006.01)
G01F 11/00 (2006.01)
G01F 11/20 (2006.01)

(52) U.S. Cl. .................. 222/240; 222/242; 222/333; 222/413

(58) Field of Classification Search ......... 222/239–242, 222/333, 334, 413; 111/130–133, 11–13
See application file for complete search history.

(56) References Cited

U.S. PATENT DOCUMENTS

| 649,232 | A | 5/1900 | Berger |
|---|---|---|---|
| 2,768,095 | A | 10/1956 | Tadema et al. |
| 4,214,149 | A * | 7/1980 | Hoffmann ............ 392/384 |
| 4,307,822 | A * | 12/1981 | Hardesty ............ 222/352 |
| 4,356,934 | A | 11/1982 | Knake |
| 4,394,845 | A | 7/1983 | Porter et al. |
| 4,503,803 | A | 3/1985 | Barnes |
| 4,586,459 | A | 5/1986 | Schultz |
| 4,895,106 | A | 1/1990 | Barnes |
| 5,512,099 | A | 4/1996 | Grossweiler et al. |
| 5,607,717 | A | 3/1997 | Grossweiler et al. |
| 5,862,957 | A | 1/1999 | Nuttall |
| 5,993,903 | A | 11/1999 | Toepfer et al. |
| 6,148,748 | A | 11/2000 | Bardi et al. |
| 6,155,185 | A | 12/2000 | Memory et al. |
| 6,793,964 | B2 | 9/2004 | Hoad |

* cited by examiner

Primary Examiner—Christopher J. Novosad
(74) Attorney, Agent, or Firm—Brendan B. Dix

(57) ABSTRACT

A powdered seed treatment applicator for evenly applying a powdered seed treatment to seeds to be dispensed and planted by a planting machine includes a container, a shaft, and a motor for rotating said shaft in the container. A dispensing element having a plurality of openings is positioned at a bottom of the container. Dispensing bristles are coupled to the shaft and contact the openings as the shaft rotates to urge powdered seed treatment out of the container through the openings while preventing clogging of the openings. Augers and paddles are utilized to provide agitation of the seed treatment, prevent clumping, and facilitate efficient dispensing of the powdered seed treatment within the container. An adjustable dispensing portion is also provided.

24 Claims, 5 Drawing Sheets

POWDERED SEED TREATMENT APPLICATOR

BACKGROUND OF THE INVENTION

1. Field of the Invention

The present invention relates to seed treatment applicators and more particularly pertains to a new powdered seed treatment applicator for evenly applying a powdered seed treatment to seeds to be dispensed and planted by a planting machine.

2. Description of the Prior Art

The use of seed treatment applicators is known in the prior art. U.S. Pat. No. 4,503,803 and U.S. Pat. No. 4,895,106, both issued to Barnes, disclose the process in which the present invention would be used. Seeds are transported to a planting machine using an auger. A seed treatment applicator dispenses seed treatment to the seeds as they are moved to the planting machine by the auger. U.S. Pat. No. 5,862,957 issued to Nuttall discloses a seed inoculant applicator that utilizes an auger positioned within a dispensing cylinder. The applicators shown by Barnes is subject to clogging and provide more limited adjustability to control the metered dispensation of a powdered seed treatment. The Nuttall device provides limited adjustability for dispensing the powdered seed treatment to a desired location. Other seed treatment applicators are known but apply a liquid form of treatment to the seeds. In contrast, the present invention provides metered dispensation of powdered seed treatment with greater adjustability and improved structure to prevent clogging.

In these respects, the powdered seed treatment applicator according to the present invention substantially departs from the conventional concepts and designs of the prior art, and in so doing provides an apparatus primarily developed for the purpose of evenly applying a powdered seed treatment to seeds to be dispensed and planted by a planting machine.

SUMMARY OF THE INVENTION

In view of the foregoing disadvantages inherent in the known types of seed treatment applicators now present in the prior art, the present invention provides a new powdered seed treatment applicator construction wherein the same can be utilized for evenly applying a powdered seed treatment to seeds to be dispensed and planted by a planting machine.

To attain this, the present invention generally comprises a container, a shaft, and a motor for rotating said shaft in the container. A dispensing element having a plurality of openings is positioned at a bottom of the container. Dispensing bristles are coupled to the shaft and contact the openings as the shaft rotates to urge powdered seed treatment out of the container through the openings while preventing clogging of the openings. Augers and paddles are utilized to provide agitation of the seed treatment, prevent clumping, and facilitate efficient dispensing of the powdered seed treatment within the container.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Significant advantages of the present invention include the metered dispensation of seed treatment without clogging and with adjustability to control the rate of flow of the seed treatment. Further, the motive action of the beater portion, paddles, and augers aerates the powdered seed treatment to counteract settling, increase volume, and reduce the amount of powdered seed treatment needed to sufficiently treat a given amount of seeds.

Further advantages of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects of the invention will become apparent when consideration is given to the following detailed description thereof. Such description makes reference to the annexed drawings wherein.

DESCRIPTION OF PREFERRED EMBODIMENTS

Figure 1:
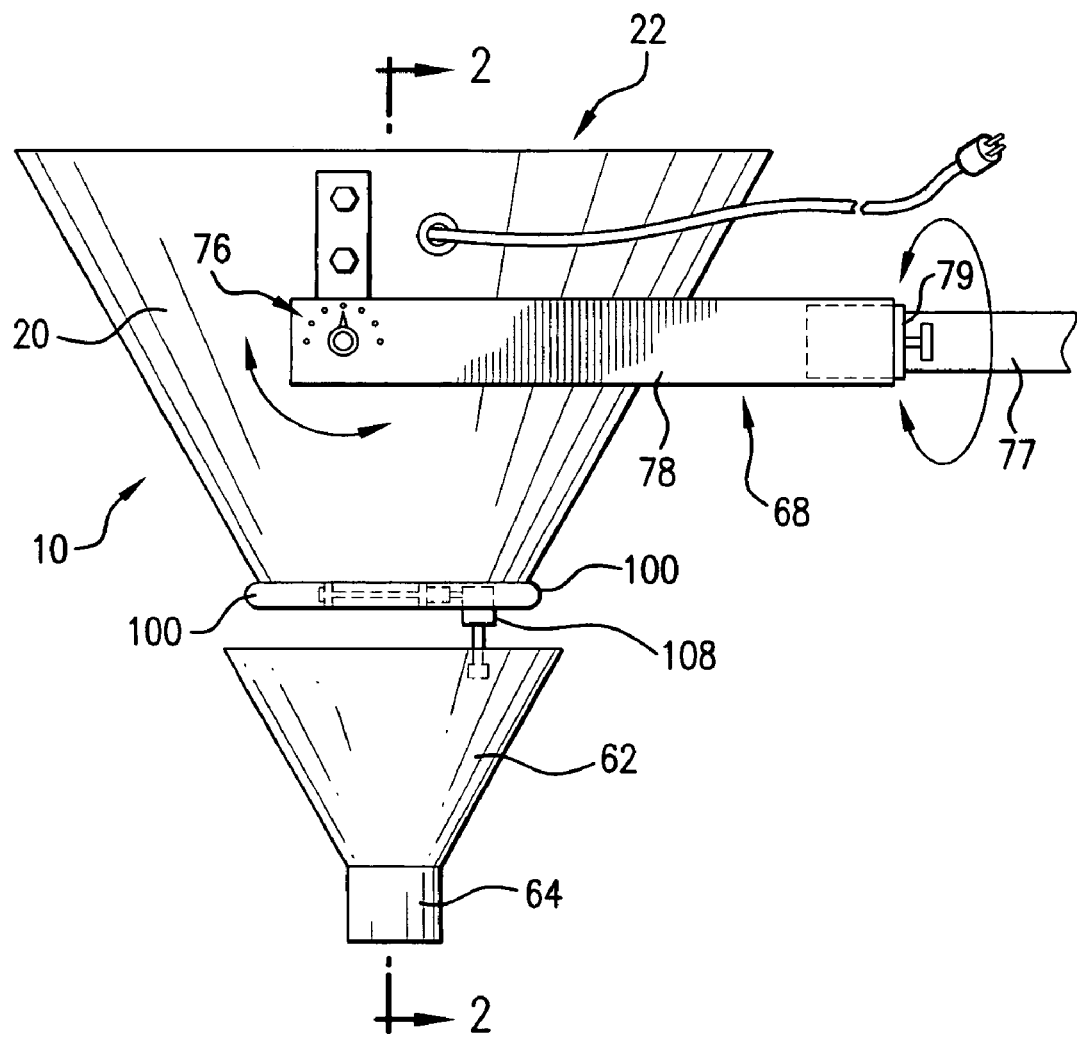
FIG. 1 is a side view of a new powdered seed treatment applicator according to the present invention.
Figure 2:
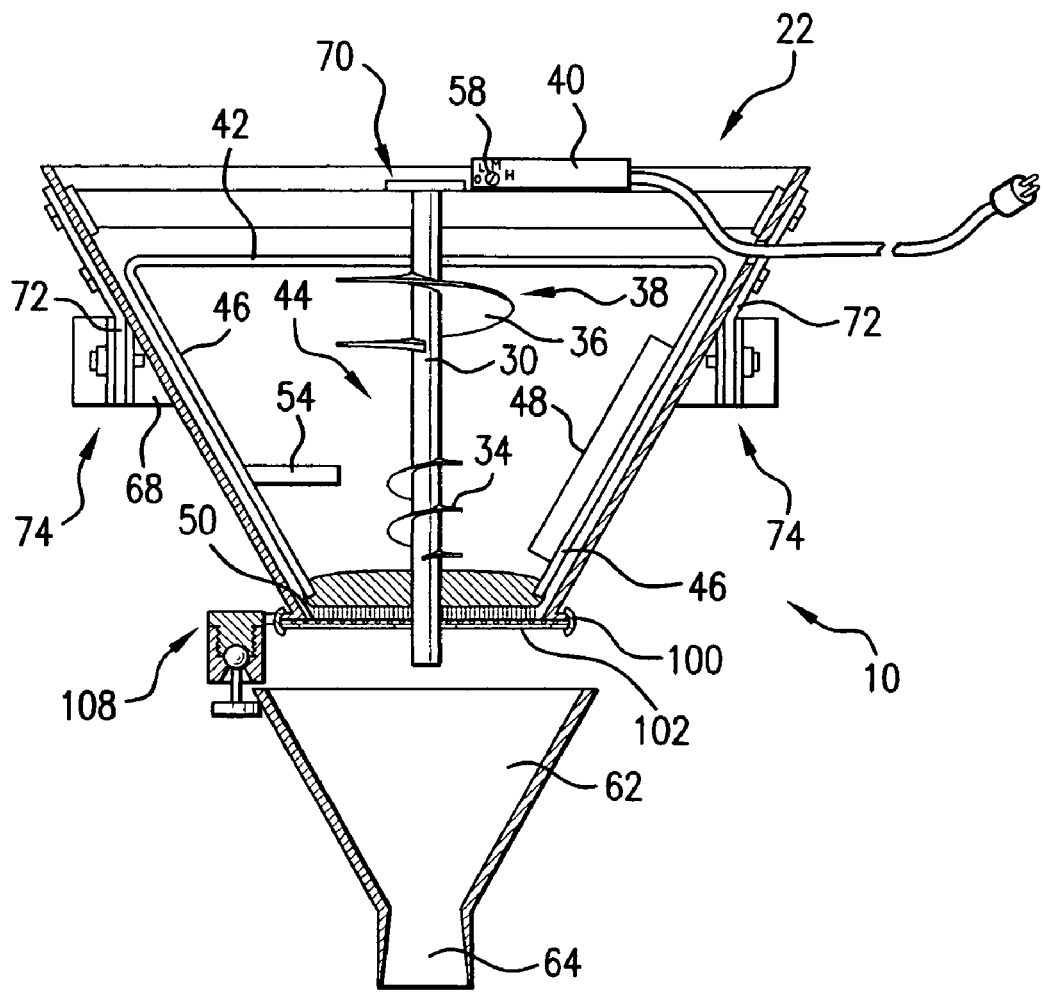
FIG. 2 is a cross-sectional view of the present invention taken along line 2-2 in FIG. 1.
Figure 3:
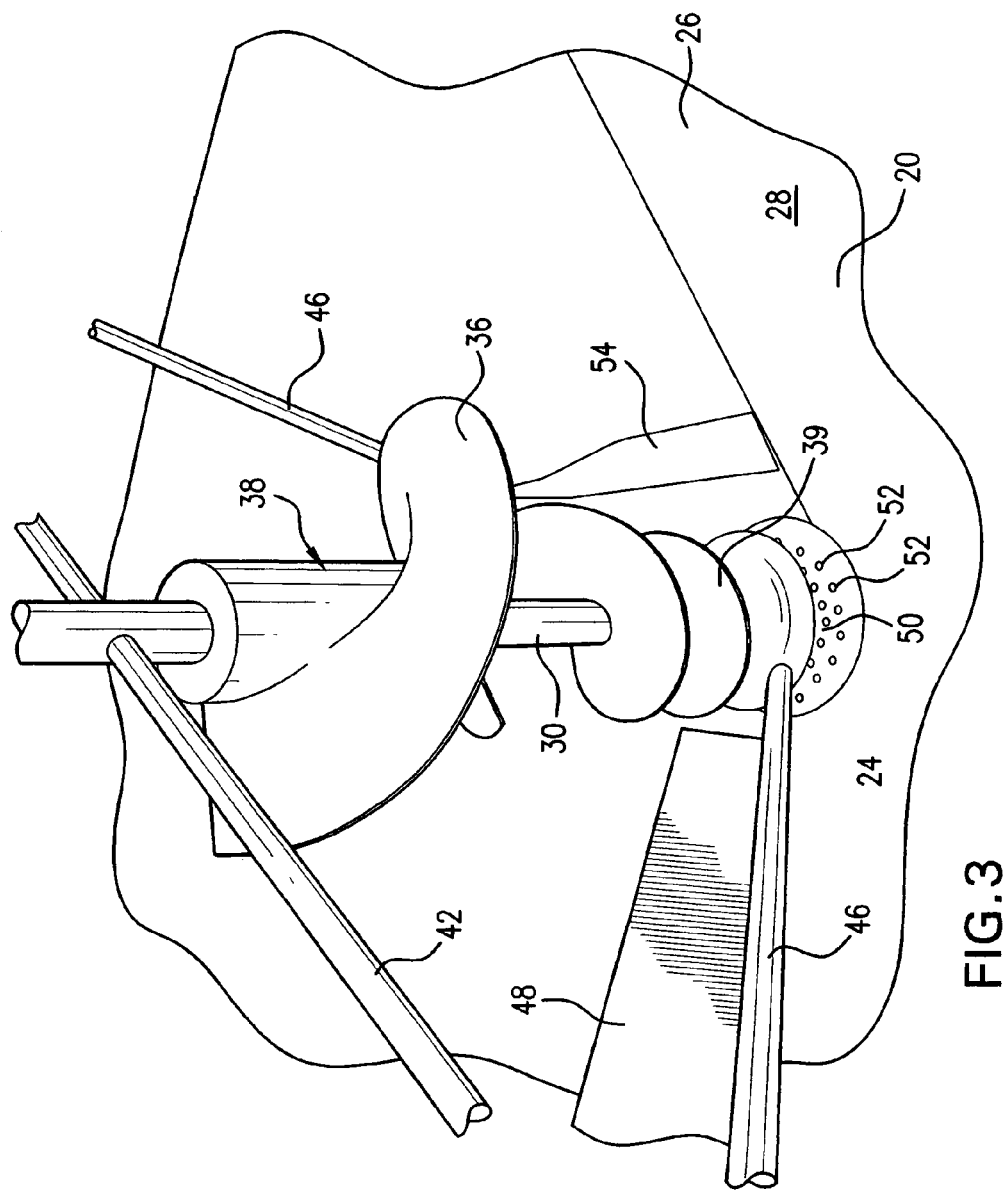
FIG. 3 is a perspective view of the interior of the container of the present invention.

With reference now to the drawings, and in particular to FIGS. 1 through 8 thereof, a new powdered seed treatment applicator embodying the principles and concepts of the present invention and generally designated by the reference numeral 10 will be described.

As best illustrated in FIGS. 1 through 8, the powdered seed treatment applicator 10 generally comprises a container 20 for holding the powdered seed treatment 2. The container 20 may be cone-shaped. A shaft 30 is coupled to the container 20.

This may be achieved using a frame assembly 32 that spans an upper opening 22 of the container 20. A motor 40 may be mounted on the frame assembly 32 and is operationally coupled to the shaft 30 for rotating the shaft 30 in the container 20. A dispensing element 50, which may be disc-shaped, includes a plurality of openings 52. The dispensing element 50 is positioned at a bottom 24 of the container 20 for permitting the powdered seed treatment 2 to pass from the container 20 through the dispensing element 50. A plurality of dispensing bristles 60 are coupled to the shaft 30. The plurality of dispensing bristles 60 are positioned adjacent to the dispensing element 50 such that the plurality of dispensing bristles 60 contact the openings 52 as the shaft 30 is rotated. Typically, the powdered seed treatment 2 has sufficient cohesion to prevent the powdered seed treatment 2 from passing through the openings 52 until the dispensing bristles 60 pass over the openings 52. Thus, the powdered seed treatment 2 passes through the openings 52 as each of the openings 52 is contacted by the dispensing bristles 60.

The motor 40 may be self-contained using a battery or powered by an outside source through use of a power outlet such as a power take-off or connection to a 12-volt outlet commonly found in vehicles.

In a more particular embodiment, a lower auger 34 is coupled to the shaft 30. The lower auger 34 may be positioned proximate the plurality of dispensing bristles 60. The lower auger 34 is designed and oriented for urging the powdered seed treatment 2 towards the dispensing element 50 as the shaft 30 is rotated by the motor 40.

An upper auger 36 may be coupled to an upper section 38 of the shaft 30. The upper auger 36 is designed and oriented such that the powdered seed treatment 2 engaged by the upper auger 36 is urged away from the dispensing element 50 as the shaft 30 is rotated by the motor 40 to provide agitation to the powdered seed treatment 2.

The shaft 30 may include a beater portion 42 and a central portion 44. The beater portion 42 extends outwardly from the central portion 44 to position outer sections 46 of the beater portion 42 proximate to a wall 26 of the container 20. A paddle 48 may be coupled to the beater portion 42 for agitating the powdered seed treatment 2 as the shaft 30 is rotated by the motor 40. The paddle 48 may be coupled to the beater portion 42 adjacent the wall 26 of the container 20 and angled with respect to the wall 26 of the container 20 for directing the powdered seed treatment 2 towards the central portion 44 of the shaft 30 as the shaft 30 is rotated by the motor 40.

Outer bristles may be coupled to the beater portion 42. The outer bristles are positioned to contact an inner surface 28 of the wall 26 of the container 20.

Over time it is anticipated that the dispensing bristles 60 can wear and effectively shorten resulting in a loss of contact with the dispensing element 50. A set screw assembly 70 or similar conventionally known structure may be employed for adjusting a position of the dispensing element 50 relative to the plurality of dispensing bristles 60 to maintain the desired contact between the element 50 and the bristles 60 during use.

In an embodiment of the present invention, an elongated second paddle 54 may be coupled to the beater portion 42 of the shaft 30 such that the elongated second paddle 54 trails behind an outer section 46 of the beater portion 42. The second paddle 54 may be angled to urge the powdered seed treatment 2 away from the dispensing element 50 as the shaft 30 is rotated by the motor 40. Thus, the second paddle 54 provides further agitation of the seed treatment 2.

In an embodiment, a bracing element 102 may be provided having a central aperture 104 for receiving a distal end of the shaft to hold the shaft in place during use. The bracing element 102 includes a plurality of circular openings 106 positioned to prevent alignment of solid portions of the bracing element 102 from aligning with the dispensing bristles 60 resulting in uneven distribution of the powdered seed treatment 2.

A compression collar 100 of the type commonly used in vehicle exhaust couplings may be used to provide easy removal and replacement of the dispensing element 50 such that various screen sizes may be installed to control the rate of powdered seed treatment output independent of adjusting the speed of the shaft 30.

Humidity will affect the cohesive properties of the powdered seed treatment 2 and the rate at which the seed treatment will flow through openings 52 of the dispensing element 50. Desired flow of the seed treatment through the openings 52 can be adjusted by the use of the following features of the present invention, either individually or in combination.

Figure 4:
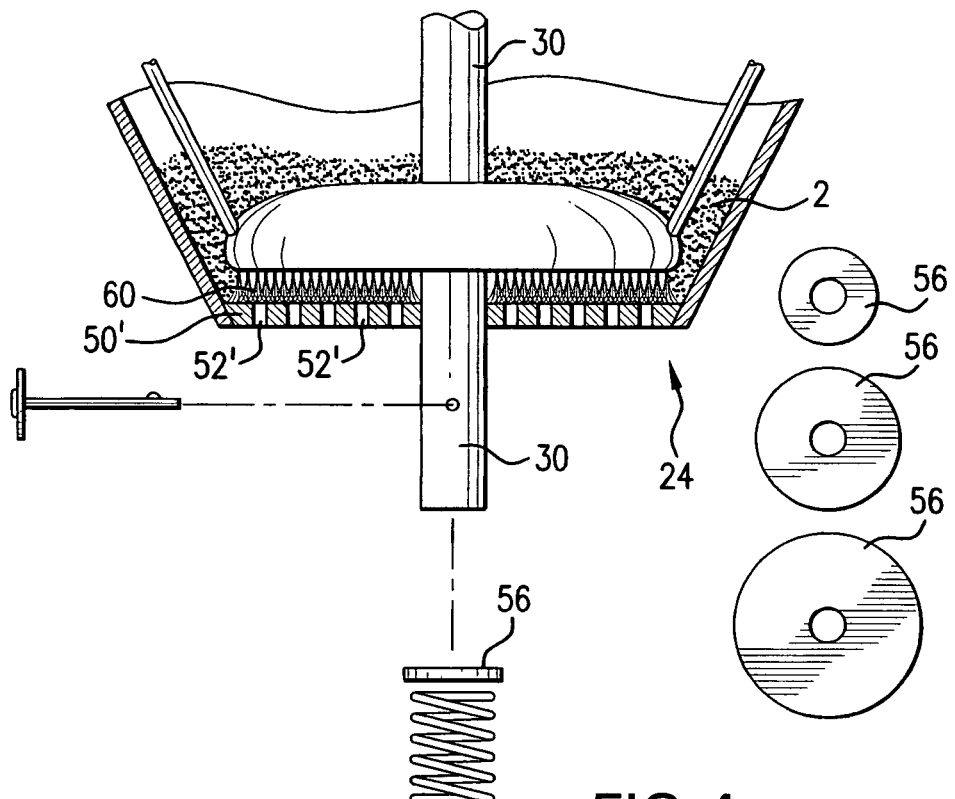
FIG. 4 is an enlarged exploded view of an alternate embodiment of the lower section of the present invention.

In an alternate embodiment shown in FIG. 4, dispensing element 50' is integrally formed to container 20. A plurality of variously sized blocking elements 56 may be provided. Each of the blocking elements 56 is selectively couplable to the dispensing element 50' to block a portion of the openings 52'. Thus, depending on the number of openings 52' blocked or unblocked, an amount of the powdered seed treatment 2 passing through the dispensing element 50' is adjustable.

Figure 5:
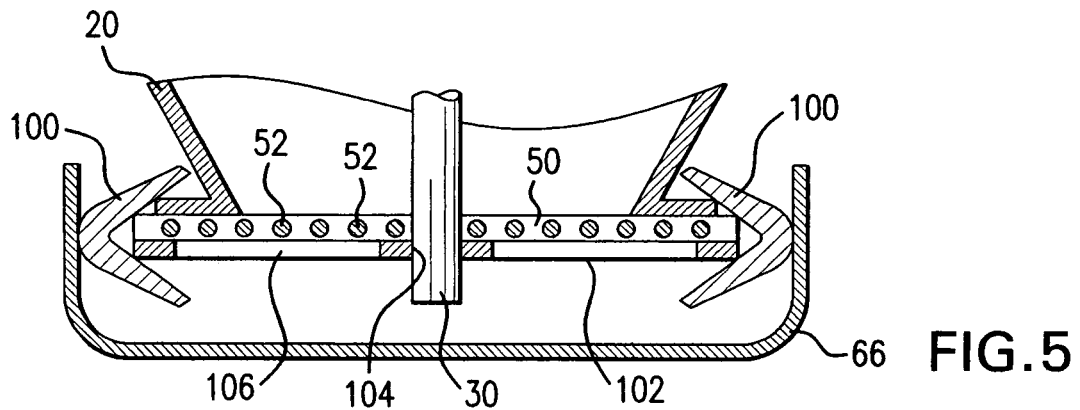
FIG. 5 is an enlarged cross-section of the lower section of an embodiment of the present invention.
Figure 6:
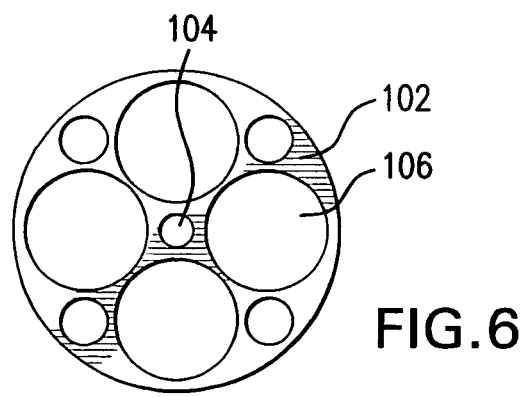
FIG. 6 is a top view of the bracing element of the present invention.
Figure 7:
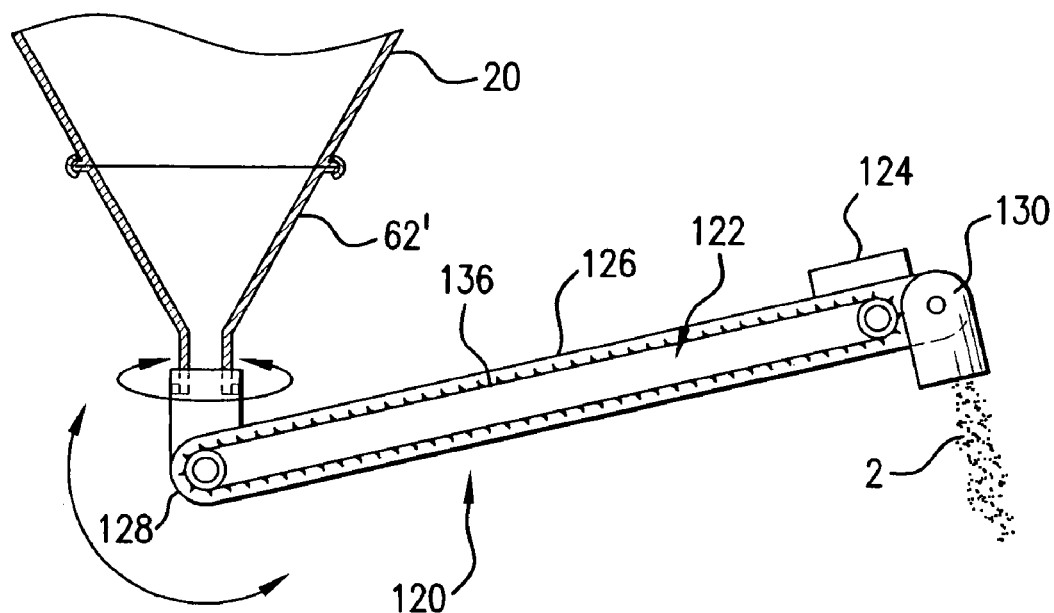
FIG. 7 is a cut-away side view of an embodiment of the delivery system of the present invention.
Figure 8:
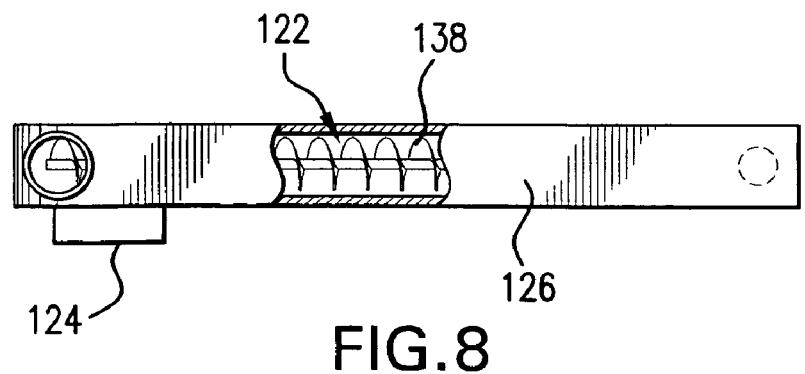
FIG. 8 is a partial cut-away top view of an embodiment of the delivery system of the present invention.

Alternately, as shown in FIG. 5, it is contemplated that a plurality of interchangeable dispensing elements 50 could be provided, each having distinct numbers or sizes of openings. Flow can also be altered by adjusting the size of the openings 52 either through multiple interchangeable dispensing elements or by a conventionally known means for adjusting the size of the openings of a single dispensing element. Interchangeable dispensing elements 50 may be formed of screen or mesh.

In an embodiment, a motor speed switch 58 may be operationally coupled to the motor 40 for controlling rotational speed of the shaft 30. Thus, a rate of flow of the powdered seed treatment 2 is adjustable by adjusting the speed the shaft 30 rotates. The switch 58 may provide distinct motor speed settings such as high, medium, and low. A rheostat-type switch or dial may be employed to provide a continuum of shaft speeds and greater control of the flow rate of the seed treatment 2 through the dispensing element 50.

A dispensing portion 62 may be adjustably coupled to the container 20 and positioned to receive the powdered seed treatment 2 passing through the dispensing element 50 and dispense the powdered seed treatment 2 to a desired location. The dispensing portion 62 may be attached to the container using a ball joint assembly 108 that is held in a desired position by compression. The dispensing portion may also be cone-shaped and include a cylindrical lower portion 64 to increase control of the dispensing of the seed treatment 2 to a desired location.

A cap 66 may be provided to selectively couple to the container 20 to cover the dispensing element 50 to prevent the powdered seed treatment 2 from passing out of the container 20 when dispensing is not desired.

The present invention may incorporate a mounting bracket 68 designed to be coupled a vehicle or other structure. The container 20 may be coupled to the mounting bracket 68 by the insertion of extensions 72 into slots 74 in the mounting bracket 68. Adjustment means 76 may be provided for adjusting an angle of the container 20 relative to the mounting bracket 68. This may be achieved using a tightened screw in an arcuate slot or urging oppositional teeth into engagement, a cotter pin through a selected one of a plurality of radially aligned apertures, or other conventionally known method.

The mounting bracket 68 may also include a base portion 77 and an extension portion 78. Rotational adjustment means 79 of conventionally known structure may be operationally coupled to the base portion 77 and the extension portion 78 for rotationally adjusting the extension portion 78 relative to the base portion 77. Thus, the position at which the container 20 dispenses the seed treatment 2 is adjustable in a plane perpendicular to a central axis of the extension portion 78.

In an embodiment, a seed treatment delivery system 120 may be coupled to either the container 20 or the dispensing portion 62 to receive the powdered seed treatment 2. The delivery system 120 includes a housing 126 or frame, a first end 128, a second end 130, and a transport assembly 122 extending from the first end 128 to the second end 130. The powdered seed treatment 2 is distributed from the container 20, with or without use of the above described dispensing bristles 60, to the first end 128 and transported to the second end 130 by the transport assembly 122 for distribution of the powdered seed treatment 2 at a desired location in spaced relationship to the container 20. The transport assembly 122 may utilize either a conveyor 136 or auger assembly 138 attached to a transport motor 124. Further, housing 126 may be open or fully enclose the transport system. The first end 128 is coupled to the container 20 by conventionally known attachment methods such that the housing 126 is adjustable in both a vertical and horizontal plane relative to the container 20.

As shown in FIG. 7, the delivery system 120 may be integrally incorporated into a dispensing portion 62' attachable to the container 20. Alternately, the delivery system 120 may be coupled to the container 20 using other conventional means such that the delivery system functions as a separate optional attachment positioned below the dispensing portion 62.

In use, powdered seed treatment is placed into the container. Depending on ambient conditions such as humidity, the device can be adjusted for opening size or number of openings used. The container is mounted on the mounting bracket and tilted to the desired position over an auger transporting seeds. The applicator is turned on to dispense the seed treatment into the auger transporting the seeds, which are then coated with the seed treatment as they are transported by the auger.

With respect to the above description then, it is to be realized that the optimum dimensional relationships for the parts of the invention, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An applicator for a powdered seed treatment, the applicator comprising:

a container for holding the powdered seed treatment;

a shaft coupled to said container;

a motor operationally coupled to said shaft for rotating said shaft in said container;

a planar dispensing element having a plurality of openings, said openings extending through said dispensing element, said dispensing element being positioned at a bottom of said container for permitting the powdered seed treatment to pass from said container through said dispensing element; and a plurality of dispensing bristles coupled to said shaft and extending out from said shaft towards said dispensing element, said plurality of dispensing bristles being positioned adjacent to said dispensing element such that said plurality of dispensing bristles contact said openings as said shaft is rotated whereby the powdered seed treatment passes through said openings as each of said openings is contacted by said dispensing bristles.

2. The applicator of claim 1 further comprising:

a lower auger coupled to said shaft, said lower auger being positioned proximate said plurality of dispensing bristles, said lower auger being oriented for urging the powdered seed treatment towards said dispensing element as said shaft is rotated by said motor.

3. The applicator of claim 1 further comprising:

an upper auger coupled to an upper section of said shaft, said upper auger being oriented for urging the powdered seed treatment away from said dispensing element as said shaft is rotated by said motor to provide agitation to the powdered seed treatment.

4. The applicator of claim 1, further comprising:

a generally cone-shaped dispensing portion adjustably coupled to said container, said dispensing portion being positionable to receive the powdered seed treatment passing through said dispensing element to dispense the powdered seed treatment to a desired location.

5. The applicator of claim 4, further comprising:

a ball joint coupling said dispensing portion to said container.

6. The applicator of claim 1, further comprising:

said shaft having a beater portion and a central portion, said beater portion extending outwardly from said central portion.

7. The applicator of claim 6, further comprising:

a paddle coupled to said beater portion for agitating the powdered seed treatment as said shaft is rotated by said motor.

8. The applicator of claim 7 wherein said paddle is coupled to said beater portion adjacent a wall of said container; and wherein said paddle is angled with respect to said wall of said container for directing the powdered seed treatment towards said central portion of said shaft as said shaft is rotated by said motor.

9. The applicator of claim 7, further comprising:

an elongated second paddle coupled to said beater portion of said shaft such that said elongated second paddle is positioned to extend horizontally within said container.

10. The applicator of claim 9 wherein said second paddle is angled to urge the powdered seed treatment away from said dispensing element as said shaft is rotated by said motor.

11. The applicator of claim 1, further comprising:

a compression collar couplable to said container for coupling said dispensing element to said container.

12. The applicator of claim 1, further comprising:

a motor speed switch operationally coupled to said motor for controlling rotational speed of said shaft whereby a rate of flow of the powdered seed treatment is adjustable.

13. The applicator of claim 1, further comprising:

a cap selectively couplable to said container to prevent the powdered seed treatment from passing out of said container through said dispensing element.

14. The applicator of claim 1, further comprising:
a mounting bracket, said container being couplable to said mounting bracket.

15. The applicator of claim 14, further comprising:
adjustment means for adjusting an angle of said container relative to said mounting bracket.

16. The applicator of claim 14, further comprising:
said mounting bracket having a base portion and an extension portion; and
rotational adjustment means operationally coupled to said base portion and said extension portion for rotationally adjusting said extension portion relative to said base portion.

17. An applicator for a powdered seed treatment, the applicator comprising:
a container for holding the powdered seed treatment;
a shaft coupled to said container;
a motor operationally coupled to said shaft for rotating said shaft in said container;
a dispensing element having a plurality of openings, said dispensing element being positioned at a bottom of said container for permitting the powdered seed treatment to pass from said container through said dispensing element;
a plurality of dispensing bristles coupled to said shaft, said plurality of dispensing bristles being positioned adjacent to said dispensing element such that said plurality of dispensing bristles contact said openings as said shaft is rotated whereby the powdered seed treatment passes through said openings as each of said openings is contacted by said dispensing bristles; and
a compression collar couplable to said container for coupling said dispensing element to said container.

18. The applicator of claim 17 further comprising:
a lower auger coupled to said shaft, said lower auger being positioned proximate said plurality of dispensing bristles, said lower auger being oriented for urging the powdered seed treatment towards said dispensing element as said shaft is rotated by said motor.

19. The applicator of claim 17 further comprising:
an upper auger coupled to an upper section of said shaft, said upper auger being oriented for urging the powdered seed treatment away from said dispensing element as said shaft is rotated by said motor to provide agitation to the powdered seed treatment.

20. The applicator of claim 17, further comprising:
a generally cone-shaped dispensing portion adjustably coupled to said container, said dispensing portion being positionable to receive the powdered seed treatment passing through said dispensing element to dispense the powdered seed treatment to a desired location.

21. The applicator of claim 17, further comprising:
said shaft having a beater portion and a central portion, said beater portion extending outwardly from said central portion.

22. An applicator for a powdered seed treatment, the applicator comprising:
a container for holding the powdered seed treatment;
a shaft coupled to said container;
a motor operationally coupled to said shaft for rotating said shaft in said container;
a dispensing element having a plurality of openings, said dispensing element being positioned at a bottom of said container for permitting the powdered seed treatment to pass from said container through said dispensing element;
a plurality of dispensing bristles coupled to said shaft, said plurality of dispensing bristles being positioned adjacent to said dispensing element such that said plurality of dispensing bristles contact said openings as said shaft is rotated whereby the powdered seed treatment passes through said openings as each of said openings is contacted by said dispensing bristles; and
a lower auger coupled to said shaft, said lower auger being positioned proximate said plurality of dispensing bristles, said lower auger being oriented for urging the powdered seed treatment towards said dispensing element as said shaft is rotated by said motor.

23. The applicator of claim 22 further comprising:
an upper auger coupled to an upper section of said shaft, said upper auger being oriented for urging the powdered seed treatment away from said dispensing element as said shaft is rotated by said motor to provide agitation to the powdered seed treatment.

24. The applicator of claim 22, further comprising:
a generally cone-shaped dispensing portion adjustably coupled to said container, said dispensing portion being positionable to receive the powdered seed treatment passing through said dispensing element to dispense the powdered seed treatment to a desired location.

\* \* \* \* \*